US009432076B2

(12) United States Patent
Cohen (10) Patent No.: US 9,432,076 B2
(45) Date of Patent: Aug. 30, 2016

(54) LINEARITY ENHANCEMENT FOR CONCURRENT TRANSMISSION SYSTEMS AND METHODS

(71) Applicant: Intel IP Corporation, Santa Clara, CA (US)

(72) Inventor: Emanuel Cohen, Zichron Yaacov (IL)

(73) Assignee: Intel IP Corporation, Santa Clara, CA (US)

( * ) Notice: Subject to any disclaimer, the term of this patent is extended or adjusted under 35 U.S.C. 154(b) by 83 days.

(21) Appl. No.: 14/164,438

(22) Filed: Jan. 27, 2014

(65) Prior Publication Data

US 2015/0214996 A1    Jul. 30, 2015

(51) Int. Cl.
| | |
|---|---|
| H04W 4/00 | (2009.01) |
| H04B 1/62 | (2006.01) |
| H04B 1/04 | (2006.01) |
| H04W 88/08 | (2009.01) |
| H04L 29/06 | (2006.01) |
| H04W 80/04 | (2009.01) |
| H04W 84/18 | (2009.01) |
| H04W 88/06 | (2009.01) |
| H04B 1/00 | (2006.01) |

(52) U.S. Cl.
CPC .............. *H04B 1/62* (2013.01); *H04B 1/0067* (2013.01); *H04B 1/0475* (2013.01); *H04L 29/06* (2013.01); *H04W 80/04* (2013.01); *H04W 84/18* (2013.01); *H04W 88/06* (2013.01); *H04W 88/08* (2013.01); *H04B 2001/0425* (2013.01); *H04B 2001/0433* (2013.01)

(58) Field of Classification Search
CPC ... H04W 80/04; H04W 88/06; H04W 88/08; H04W 84/18; H04L 29/06

USPC ......................................................... 370/328
See application file for complete search history.

(56) References Cited

U.S. PATENT DOCUMENTS

| | | | | |
|---|---|---|---|---|
| 5,991,269 | A * | 11/1999 | Williamson | ............ H04L 5/006 370/241 |
| 6,587,513 | B1 * | 7/2003 | Ichihara | ................. H03C 3/406 330/149 |
| 7,035,345 | B2 | 4/2006 | Jeckeln et al. | |
| 7,279,972 | B2 * | 10/2007 | Smithson | .............. H03F 1/3247 330/149 |
| 8,380,144 | B1 * | 2/2013 | Bai | ...................... H04B 1/0075 375/296 |
| 2001/0000456 | A1 * | 4/2001 | McGowan | ..................... 370/342 |
| 2004/0037282 | A1 * | 2/2004 | Boland | ............. H04W 72/1205 370/392 |
| 2006/0291538 | A1 * | 12/2006 | Cangiani | ................. H04L 5/026 375/146 |
| 2007/0018718 | A1 * | 1/2007 | Horng et al. | .................... 330/10 |
| 2009/0207808 | A1 * | 8/2009 | McCann | ........... H04W 36/0016 370/331 |
| 2010/0174202 | A1 * | 7/2010 | Hersh | ................. A61B 5/02225 600/494 |
| 2010/0303033 | A1 * | 12/2010 | Shahar | .............. H04W 72/1257 370/329 |
| 2011/0110229 | A1 * | 5/2011 | Himayat et al. | .............. 370/230 |

(Continued)

*Primary Examiner* — Mark Rinehart
*Assistant Examiner* — Sanjay K Dewan
(74) *Attorney, Agent, or Firm* — Eschweiler & Associates, LLC (57) ABSTRACT

A system using multiple communication technologies for concurrent transmission is disclosed. The system includes a first technology modem, a second technology modem, and a transmit chain. The first technology modem is configured to provide a first technology signal for transmission using a first communication technology. The second technology modem is configured to provide a second technology signal for transmission using a second communication technology. The second communication technology is varied from the first communication technology. The transmit chain is configured to develop a combined envelope and to generate a transmit signal from the first technology signal and the second technology signal using the combined envelope.

20 Claims, 5 Drawing Sheets

(56) References Cited

U.S. PATENT DOCUMENTS

| | | | | |
|---|---|---|---|---|
| 2013/0088383 A1* | 4/2013 | Forstner | ............... | H01Q 1/3233 342/175 |
| 2013/0089123 A1* | 4/2013 | Rahul | ................. | H04L 27/2691 375/219 |
| 2014/0004802 A1* | 1/2014 | Ljung et al. | .................... | 455/73 |
| 2014/0120969 A1* | 5/2014 | Sang | ...................... | H04B 1/406 455/501 |
| 2014/0362744 A1* | 12/2014 | Yan et al. | ...................... | 370/280 |
| 2015/0282099 A1* | 10/2015 | Laaser | ................ | H04W 52/243 455/67.13 |

* cited by examiner

LINEARITY ENHANCEMENT FOR CONCURRENT TRANSMISSION SYSTEMS AND METHODS

BACKGROUND

Generally, communication systems utilize a particular technology for exchanging information. At a first device, a transmitter uses the particular technology to generate and transmit a communication signal. At a second device, a receiver uses the particular technology to receive the communication signal.

However, communicating with only a single technology can be problematic. Other devices using a different communication technology are unable to communicate with the first and second device.

One technique to overcome this limitation is to incorporate first and second communication technologies into a single device. This permits the single device to communicate with other devices using either technology.

One technique to incorporate the first and second technologies into a single device is to construct two separate transmission chains, one for each of the technologies. Thus, each chain includes separate amplifiers, antenna, and the like. However, having separate transmission chains substantially increases the costs and complexity. Another technique is to develop and utilize a schedule where time slots are allocated to each communication technology. Then, the first technology is used only in its assigned time slots and the second technology is used only in its assigned time slots. However, devices may utilize incorrect time slots for a given communication technology. Additionally, throughput is substantially slowed as only one communication technology can be used at a time. Finally, establishing a schedule for all devices that may want to communicate can be problematic.

DETAILED DESCRIPTION

The systems and methods of this disclosure are described with reference to the attached drawing figures, wherein like reference numerals are used to refer to like elements throughout, and wherein the illustrated structures and devices are not necessarily drawn to scale.

Devices, such as smart phones and tablets, rely on communications in order to provide users a good experience. In order to enhance the experience, multiple communication technologies can be used concurrently. For example, two common communication technologies are Bluetooth and WiFi (wireless internet). Devices that utilize Bluetooth and WiFi can communicate in more places and with more devices that devices that use only one of the technologies.

A challenge to using multiple communication technologies is concurrency or TX/TX concurrency issues. The concurrency issues occur due to interference and the like between using multiple technologies on a single device. For example, operating in the same bandwidth, such as WiFi and Bluetooth which operate in the same 2.4 GHz band, develop concurrency issues.

One technique to incorporate the first and second technologies into a single device is to construct two separate transmission chains, one for each of the technologies. Thus, each chain includes separate amplifiers, antenna, and the like. However, having separate transmission chains substantially increases the costs and complexity.

Another technique is to develop and utilize a schedule where time slots are allocated to each communication technology. Then, the first technology is used only in its assigned time slots and the second technology is used only in its assigned time slots. However, devices may utilize incorrect time slots for a give communication technology. Additionally, throughput is substantially slowed as only one communication technology can be used at a time. Finally, establishing a schedule for all devices that may want to communicate can be problematic.

Sharing a part of a transmit chain, such as a power amplifier, is another technique. However non-linearities of the power amplifier and envelopes/characteristics of each communication technology should be accounted for.

The below systems and methods share at least a portion of a transmit chain, including a power amplifier, in order to provide concurrent communication with suitable bandwidths for multiple communication technologies. Characteristics/envelopes for the multiple technologies are utilized in a pre-distortion block to mitigate concurrency issues and facilitate communication.

Figure 1:
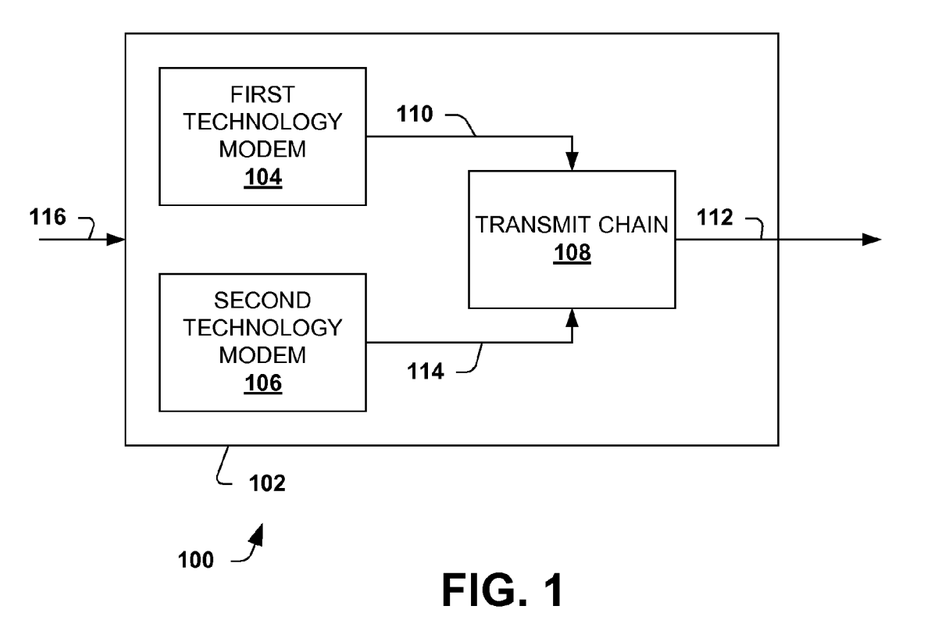
FIG. 1 is a block diagram illustrating a communication system having multiple communication technologies for concurrent transmission.

FIG. 1 is a block diagram illustrating a communication system 100 having multiple communication technologies for concurrent transmission. The multiple communication technologies share at least a portion of a transmit chain in order to mitigate concurrency issues and facilitate communication.

The system 100 is a communication system and can be incorporated as part of a device. The system 100 can have other components, but is shown with only a transmit component 102 for illustrative purposes.

The transmit component 102 receives an input signal 116 and generates a transmit output signal 112 using one or more communication technologies. The input signal 116 can include a baseband signal that includes data/information for transmission. The output signal 112 is based on the one or more communication technologies and is suitable for transmission, such as transmission with an antenna.

The transmit component 102 includes a first technology modem 104, a second technology modem 106, and a transmit chain 108. The first technology modem 104 receives the input signal 116 and selectively generates a first output signal 110. The output signal 110 can be one or more individual signals and includes, for example, data packets and envelope characteristics. The first technology modem 104 uses a first communication technology, such as wireless local area networks, personal area networks, wireless communication networks, Bluetooth, WiFi, LTE (Long Term Evolution), and the like to generate the first output signal 110.

The second technology modem 106 also receives the input signal 116 and selectively generates a second output signal 114. The output signal 114 can include one or more individual signals and includes, for example, data packets and envelope characteristics. The second technology modem 106 uses a second communication technology, such as wireless local area networks, personal area networks, wireless communication networks, Bluetooth, WiFi, LTE (Long Term Evolution), and the like to generate the second output signal 114. In one example, the first communication technology is WiFi and the second communication technology is Bluetooth. In another example, the first communication technology is WiFi and the second communication technology is LTE. The second communication technology is typically varied from the first communication technology. Further, it is appreciated that the second technology modem 106 can be configured to provide envelope characteristics to the first technology modem 104 as well. It is also appreciated that the modems 106 can include additional components to obtain the envelopes/envelope characteristics.

The transmit chain 108 receives the first and second output signals 110 and 114 and generates the transmit signal 112 using a single power amplifier. Generally, the transmit chain 108 modifies or predistorts the output signals 110 and 114 with a pre-distortion based on envelopes and/or characteristics of both the first and second communication technologies. Additionally, both output signals/streams 110 and 114 are combined into the transmit output signal 112. Thus, concurrent communication technologies, the first and second technologies, are used at the same time using at least a portion of the transmit chain. Further, the transmit signal 112 is generated with enhanced linearity for the multiple communication technologies by addressing distortions and/or envelopes from the technologies.

Figure 2A:
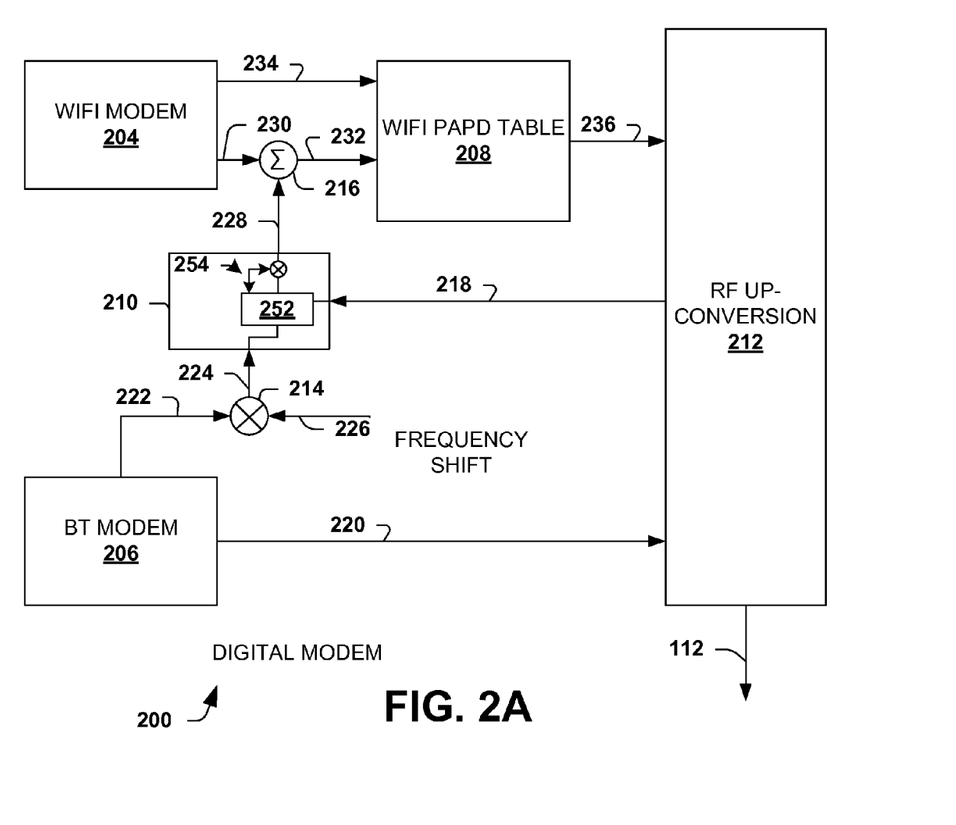
FIG. 2A is a block diagram illustrating a communication system and a digital modem portion of the system.
Figure 2B:
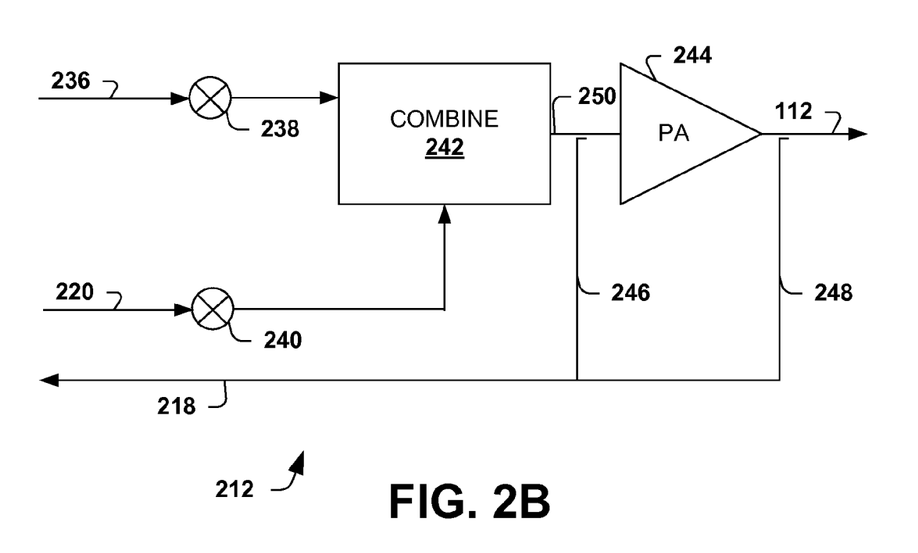
FIG. 2B is a diagram illustrating an RF up-conversion component of the system.

FIGS. 2A and 2B depict a communication system 200 having multiple communication technologies for transmission. The system 200 is described as an example of a more detailed version/implementation of the system 100, described above. The system 200 uses power amplifier predistortion based on envelopes/characteristics of the multiple technologies in order to mitigate concurrency issues.

The system 200 is described in conjunction with WiFi and Bluetooth technologies for illustrative purposes and to facilitate understanding. However, it is appreciated that other communication technologies can be used with and/or instead of WiFi and Bluetooth, such as LTE and/or other cellular communication technologies.

FIG. 2A is a block diagram illustrating the communication system 200 and, in particular, a digital modem portion of the system 200. The digital modem portion includes a WiFi modem 204, a Bluetooth (BT) modem 206, a power amplifier pre-distortion (PAPD) table 208, an alignment component 210, an envelope mixer 216 and an alignment mixer 214.

The BT modem 206 provides a BT envelope 222 and a BT packet/signal 220. The BT modem 206 uses Bluetooth communication technology to generate the envelope 222 and packet 220. The communication technology has other characteristics/requirements including, for example, bandwidth, power requirements, data rate requirements, and the like. These characteristics are provided with the envelope 222 and the packet 220.

Similarly, the WiFi modem 204 provides a WIFI envelope 230 and a WIFI packet/signal 234. The WIFI modem 204 uses WiFi communication technology to generate the envelope 230 and the packet 234. The communication technology has other characteristics/requirements including, for example, bandwidth, power requirements, data rate requirements, and the like. These characteristics are provided with the envelope 230 and the packet 234.

The alignment mixer 214 is configured to combine the BT envelope 222 with a signal 226 and generate combined envelope signal 224. The signal 226 is a frequency shift for the BT envelope 222 based on modem data of the distance between the WiFi and BT transmissions at RF (WiFi and BT portions of the output signal 112). In one example, the signal 226 is provided by the RF up-conversion component 212. The alignment component 210 aligns the combined BT envelope 224 with a phase and frequency of a feedback signal 218. The feedback signal 218 is based on an output signal 112 of the system 200 and is provided by an RF up-conversion component 212. The alignment component 210 is configured to generate an aligned envelope 228 from the feedback signal 218 and the combined envelope 224. The alignment performed by the alignment component 210 permits combining envelopes and using the combined envelope for predistortion. The alignment component 210 performs an initial calibration in order to align the BT envelope 222. Thereafter, the alignment component 210 fine tunes the phase and frequency to maintain and/or improve alignment.

In one example, the component 210 includes a timing alignment 252 configured to incorporate a timing shift/factor 254. The timing alignment 252 determines the shift 254 based on the transmission/output signal 112 via the feedback signal 218. The alignment 252 then adds the shift 254 to provide the aligned BT envelope 228. Thus, the BT envelope 228 is aligned to compensate for a different delay for a BT RF portion of the output signal 112 as compared with the WiFi RF portion of the output signal 112. Additionally, the component 210 can be configured to develop orutilize a scaling factor based on power levels of the BT RF and WiFi RF portions of the output signal 112. The scaling factor and the timing shift 254 are referred to as alignment parameters.

The envelope adder 216 combines the aligned BT envelope 228 with the WIFI envelope 230 to provide a combined envelope 232. In one example, the envelope mixer 216 is summation component and combines or addes the signals 228, 230 into the combined envelope 232.

The power amplifier predistortion table 208 develops and applies a predistortion to an input signal, in this example the WIFI packet 234 and provides the predistorted signal as its output signal 236. In one example, the combined envelope 232 is used to develop the predistortion using a lookup table. The predistortion includes an inverse of expected distortions based on the combined envelope from multiple communication technologies, which in this example includes Bluetooth and WiFi. The predistortion is such that the expected distortions are substantially removed from the transmit signal 112. More details on a suitable PAPD table are described below in FIG. 3. It is noted that the output signal 236 is essentially the WIFI packet 234 with the applied predistortion based on the combined envelope 232.

The RF up-conversion component 212 is configured to combined the predistorted signal 236 with the BT packet 220 and generate the output transmit signal 112. The RF component 212 uses only a single power amplifier and combines the signals 236 and 220 prior to amplification by the power amplifier. The RF component 212 generates the feedback signal 218 based on the transmit signal 112. In one variation, the feedback signal 218 is generated based on a combination of the signals 236 and 220, prior to amplification.

FIG. 2B is a diagram illustrating the RF up-conversion component 212 of the system 200. The component 212 includes a first mixer 238, a second mixer 240, a combine component 242, and a power amplifier 244.

The first mixer 238 is configured to combine additional signals/factors with the WIFI packet 236. The factors/signals include scaling factors and the like. The modified packet is provided at its output and is also provided to the combine component 242. The second mixer 240 is also configured to combine additional signals/factors with the predistorted signal 220. The signals/factors can include scaling factors and the like.

The combine component 242 combines the modified signals 236 and 220 into a single output signal 250. The signal 250 includes the predistortion based on envelopes and packets from both communication technologies. The signal 250 is suitable for amplification and includes the predistortion to mitigate distortions for both communication technologies.

The power amplifier 244 is configured to amplify the signal 250 and generate the transmit signal 112. The predistortions present in the signal 250 mitigate distortions introduced by the power amplifier 244, including, but not limited to non-linearity distortions. Thus, the transmit signal 112 is substantially free from distortions and includes packets from both communication technologies. The transmit signal 112 can be transmitted via an antenna (not shown).

Parameters for operation of the power amplifier 244 are configured to facilitate concurrent communication/transmission. For example, power/gain may be adjusted to facilitate adequate cancelation of distortions and/or band edge requirements. Other adjustments may be needed to comply with spectrum characteristics.

The component 212 also generates the feedback signal 218. In one example, the feedback signal 218 is a coupled version 248 of the transmit signal 112. In another example, the feedback signal 218 is a coupled version 246 of the combined, predistorted signal 250.

Thus, the communication system 200 provides the transmit signal 112 configured to include concurrent packets/data from multiple technologies using a single transmission chain, including a single power amplifier. As a result, multiple communication technologies can be used and transmitted concurrently.

Figure 3:
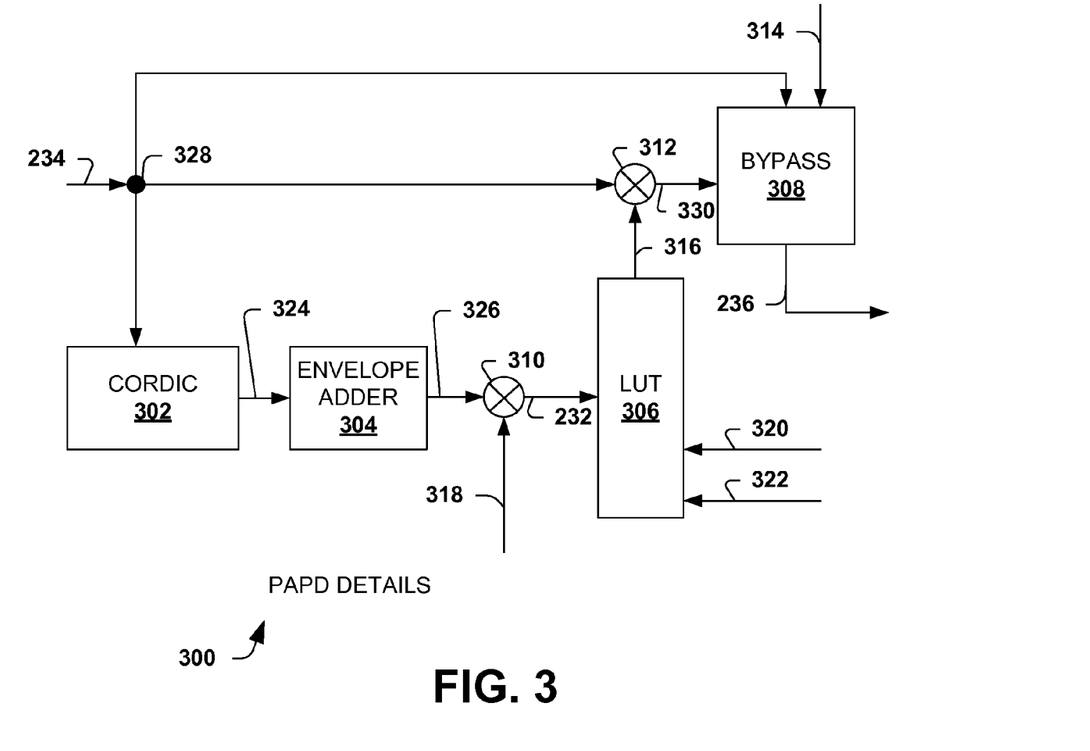
FIG. 3 is a diagram illustrating a power amplifier predistortion table.

FIG. 3 is a diagram illustrating a power amplifier predistortion table 300. This table/component can be utilized as the power amplifier predistortion table 208 in FIG. 2, described above.

The power amplifier predistortion (PAPD) table 208 develops and applies a predistortion to an input signal. The predistortion is based on multiple communication technologies, such as WiFi, Bluetooth, and the like. The predistortion from the multiple technologies is applied to the input signal, which is a data or packet generated using one of the multiple technologies. The predistortion includes an inverse of expected distortions based on the combined envelope from multiple communication technologies and is such that the expected distortions are substantially removed at later stages of a transmit chain.

The PAPD table 300 includes a cordic 302, an envelope adder 304, a first mixer 310, a lookup table (LUT) 306, a second mixer 312, and a bypass component 308.

An input node 328 receives an input data/packet signal 234. In one example, the signal 234 is a packet based on a first technology, such as WiFi. The input node 328 distributes the signal 234 to multiple components including, the cordic 302, the second mixer 312 and the bypass component 308.

The cordic 302 (computational unit) obtains or extracts a first envelope from the input signal 234. The first envelope is provided as its output 324. The envelope adder 304 adds one or more envelopes from other communication technologies to generate a combined technology envelope 326. The envelopes from the other communication technologies are typically aligned in phase and frequency with the first envelope. In one example, the adder 304 performs these alignments. In other examples, other components not shown perform the alignments. The first mixer 310 scales the combined technology envelope 326 according to a selected scale factor 318 to provide a scaled, combined technology envelope 232. In one example, the scale factor 318 is one of the alignment parameters described above with reference to FIGS. 2A and 2B.

The Look Up Table (LUT) 306 includes predistortions for a power amplifier. The predistortions are stored according to characteristics, such as envelopes. The combined envelope 232 is used as an index to the LUT 306, which provides appropriate distortions/table value(s) 316 in response. The LUT 306 also receives signals 320 and 322, which can be used to modify or adjust contents of the LUT 306. Using the combined envelope 232 instead of the first envelope 324 alters the index/addressing to the LUT 306 and, as a consequence, alters the table values/distortions applied to the input signal 234.

The second mixer 312 is complex and multiplies the table values 316 with the input signal 234 to obtain a first distorted signal 330. The signal 330 includes predistortions/table values based on the combined technology envelope 232.

The bypass component 308 receives the predistorted signal 330 and the signal 234. A bypass control signal 314 configures the bypass component 308 to pass one of the signals 330 and 234 as the signal 236. Thus, the bypass component 308 can be configured to not include the one or more other communication technology envelopes or characteristics in the generated signal 236. Of course, the bypass component 308 can also be configured to include the one or more other communication technology envelopes or characteristics in the generated signal 236.

Figure 4:
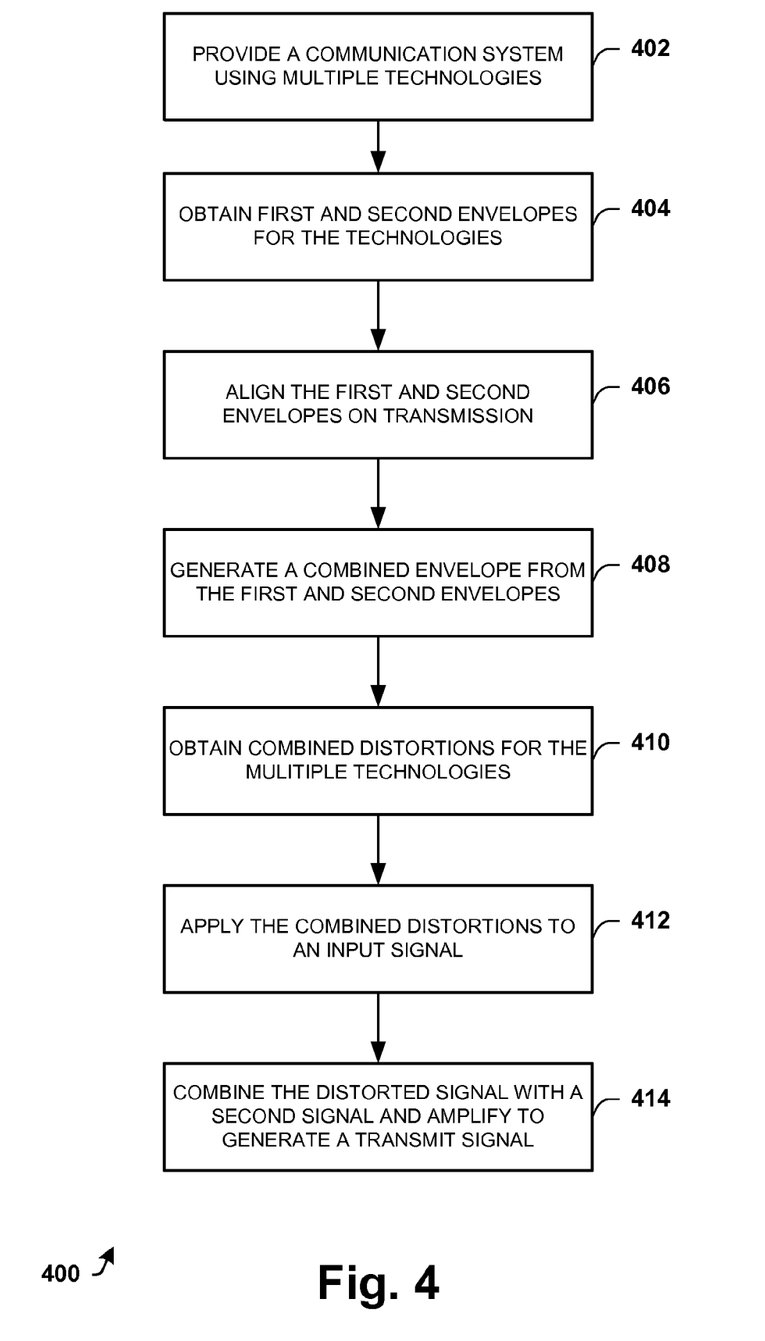
FIG. 4 is a flow diagram illustrating a method of operating a communication system having multiple communication technologies.

FIG. 4 is a flow diagram illustrating a method 400 of operating a communication system having multiple communication technologies. The method 400 obtains and aligns envelopes for the multiple technologies. The envelopes are used to apply a combined predistortion and facilitate concurrent communication using the multiple communication technologies.

The method begins at block 402, where a communication system is provided. The system can include one of the above systems and/or variations thereof. Generally, the system includes a modem for generating a data/packet signal for each communication technology and a transmission chain shared by both for generating a single transmit signal. Some examples of communication technologies used include Bluetooth, WiFi, and the like.

First and second envelopes are obtained at block 404. Generally, the first envelope is obtained from a first modem and the second envelope is obtained from a second modem. The first and second envelopes correspond to first and second communication technologies. In one example, the envelope is provided as a modem output. In another example, the envelope is obtained using a cordic component, such as described above, which derives the envelope from an output signal of the modem.

The first and second envelopes are aligned based on respective portions of an RF transmission signal at block 406. The envelopes are aligned using alignment parameters, which include a timing shift and a scaling factor. The timing shift compensates for different delay(s) in a first technology portion of the RF transmission signal and a second technology portion of the RF transmission signal. The scaling factor compensates for different power levels in the first technology portion of the transmission signal and the second technology portion of the RF transmission signal.

A combined envelope is generated at block 408 from the first and second envelopes. A power amplifier pre distortion table/component can be used to generate the combined envelope. Alignment, in terms of phase and/or frequency, may be performed on one or both of the first and second envelopes. Then, the envelopes are combined or added to generate the combined envelope, which represents a combination of the envelopes/characteristics for the multiple technologies.

Combined distortions are obtained at block 410 for the multiple technologies using the combined envelope. The combined envelope is used as an index to a lookup table. Table values are generated in response to the combined envelope and include combined distortions for the multiple technologies. In one example, the lookup table is part of the power amplifier predistortion component.

The combined distortions are applied to an input signal provided using one of the communication technologies at block 412. The input signal is a packet/data signal from one of the modems. A multiplexer can be used to combine the combined distortions with the input signal. The combined signal is a predistorted signal.

The distorted signal is combined with a second input signal and amplified to generate a transmit signal at block 414. A multiplexor can be used to combine the signals. The second input signal is also a packet/data signal from another of the modems. The combined signal includes packets from the multiple technologies and is amplified using a power amplifier to generate a transmit signal. The transmit signal includes concurrent data from the multiple technologies, including the first technology and the second communication technology.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

A system using multiple communication technologies for concurrent transmission is disclosed. The system includes a first technology modem, a second technology modem, and a transmit chain. The first technology modem is configured to provide a first technology signal for transmission using a first communication technology. The second technology modem is configured to provide a second technology signal for transmission using a second communication technology. The second communication technology is varied from the first communication technology. The transmit chain is configured to develop a combined envelope and to generate a transmit signal from the first technology signal and the second technology signal using the combined envelope.

In one example, the first communication technology is one of Bluetooth and WiFi. In another example, the second communication technology is Bluetooth.

In another example of any of the above, the transmit chain includes a power amplifier configured to generate the transmit signal.

In another example of any of the above, the first technology signal includes a data packet and a first envelope and the second technology signal includes a second data packet and a second envelope.

In another example of any of the above, the combined envelope includes the first envelope and the second envelope. In another example of any of the above, the second envelope is aligned in phase and frequency with the first envelope.

In another example, the transmit chain includes a power amplifier predistortion table based on the first communication technology.

In another example of any of the above systems, the transmit chain includes an adder configured to combine envelopes of the first communication technology and the second communication technology into the combined envelope.

In another example of any of the above systems, the transmit chain uses a feedback signal based on the transmit signal to generate the combined envelope.

In another example of any of the above systems, the transmit chain generates a predistored signal using the combined envelope and combines the predistorted signal with a packet signal from the second technology modem to generate a combined predistorted input signal.

In another example of any of the above systems, the transmit chain is configured to selectively amplify the combined predistorted input signal to generate the transmit signal.

A power amplifier predistortion system includes an envelope adder, a lookup table and a combiner. The envelope adder is configured to combine a second envelope with a first envelope into a combined envelope. The second envelope is based on a varied communication technology from the first envelope. The lookup table is configured to provide table values in response to the combined envelop. The table values include predistortions. The combiner is configured to combine the predistortions with an input signal to generate a predistorted signal.

In one example, the system includes a second combiner configured to mix a second signal of the varied communication technology with the predistorted signal into a combined predistorted signal.

In another example, any of the above systems includes a power amplifier configured to generate a transmit signal from the combined predistorted signal.

In another example, any of the above systems includes a CORDIC component configured to obtain the first envelope from the input signal.

In another example, the envelope adder of any of the above systems is configured to align the first envelope and the second envelope in phase and frequency.

A method of operating a communication system using multiple communication technologies is disclosed. A first envelope for a first communication technology is obtained. A second envelope for a second communication technology is obtained. The first envelope and the second envelop are aligned according to alignment parameters. A combined envelope is generated from the first envelope and the second envelope. Combined distortions for the first communication technology and the second communication technology are obtained using the combined envelope. The combined distortions are applied to an input signal to generate a predistorted signal.

In one example, the method includes combining the predistorted signal with another signal and amplifying the combined signal to generate a transmit signal. The generated transmit signal includes packets for the first communication technology and packets for the second communication technology.

In another example of any of the above, the first envelop is aligned with the second envelope.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The any component or structure includes a processer executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. A system using multiple communication technologies for concurrent transmission comprising:
    a first technology modem configured to provide a first technology signal for transmission using a first communication technology, the first technology signal having an associated first envelope;
    a second technology modem configured to provide a second technology signal for transmission using a second communication technology, the second technology signal having an associated second envelope; and
    a transmit chain configured to generate a combined envelope and a transmit signal from the first technology signal and the second technology signal using the combined envelope, wherein the transmit chain includes an alignment component configured to align a phase and frequency of the second envelope with the first envelope based on a feedback signal and to combine the first envelope and the phase and frequency aligned second envelope into the combined envelope.

2. The system of claim 1, wherein the second communication technology is different from the first communication technology.

3. The system of claim 1, wherein the first and second communication technologies include one or more of a wireless local area network, a personal area network, and a wireless communication network.

4. The system of claim 3, wherein the first and second communication technologies are selected from a group comprising Bluetooth, WiFi, and LTE.

5. The system of claim 1, wherein the transmit chain includes a power amplifier configured to generate the transmit signal.

6. The system of claim 1, wherein the first technology signal includes a first data packet and the second technology signal includes a second data packet.

7. The system of claim 6, wherein the combined envelope includes the first envelope and the second envelope.

8. The system of claim 1, wherein the transmit chain includes a power amplifier predistortion table based on the first communication technology.

9. The system of claim 1, wherein the transmit chain includes an adder configured to add the first envelope and the phase and frequency aligned second envelope to form the combined envelope.

10. The system of claim 1, wherein the transmit chain is configured to generate the feedback signal based on the transmit signal.

11. The system of claim 1, wherein the transmit chain generates a predistorted signal using the combined envelope and combines the predistorted signal with a packet signal from the second technology modem to generate a combined predistorted input signal.

12. The system of claim 11, wherein the transmit chain is configured to selectively amplify the combined predistorted input signal to generate the transmit signal.

13. A predistortion system for multiple communication technologies comprising:
    an alignment component configured to align a phase and frequency of a second envelope of a second technology signal with a first envelope of a first technology signal based on a feedback signal derived from a predistorted signal;
    an envelope adder configured to combine the phase and frequency aligned second envelope with the first envelope to form a combined envelope;
    a combiner configured to combine predistortions from a look up table based on the combined envelope with an input signal to generate the predistorted signal; and
    a transmit chain configured to generate a transmit signal based on the predistorted signal.

14. The system of claim 13, further comprising a second combiner configured to mix a signal of a communication technology with the predistorted signal into a combined predistorted signal.

15. The system of claim 14, further comprising a power amplifier configured to generate a transmit signal from the combined predistorted signal.

16. The system of claim 13, wherein the second envelope is based on a different communication technology from the first envelope.

17. A method of operating a communication system using multiple communication technologies, the method comprising:
    obtaining a first envelope for a first communication technology and a second envelope for a second communication technology;

aligning the second envelope with the first envelope according to a plurality of alignment parameters based at least partially on a feedback signal;

generating a combined envelope from the first envelope and the aligned second envelope;

obtaining combined distortions for the first communication technology and the second communication technology using the combined envelope; and applying the combined distortions to an input signal to generate a predistorted signal; and generating a transmit signal using the predistorted signal.

18. The method of claim 17, further comprising combining the predistorted signal with another signal and amplifying the combined signal to generate the transmit signal having a plurality of packets for the first communication technology and the second communication technology.

19. The method of claim 17, further comprising aligning the second envelope in both phase and frequency.

20. The system of claim 13, further comprising an alignment mixer configured to apply a frequency shift to the second envelope and to provide the second envelope to the alignment component.

* * * * *